US008311115B2

(12) United States Patent
Gu et al.

(10) Patent No.: US 8,311,115 B2
(45) Date of Patent: Nov. 13, 2012

(54) VIDEO ENCODING USING PREVIOUSLY CALCULATED MOTION INFORMATION

(75) Inventors: Chuang Gu, Bellevue, WA (US); Chun-Wei Chan, Redmond, WA (US); William Chen, Issaquah, WA (US); Stacey Spears, Sammamish, WA (US); Thomas W. Holcomb, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 842 days.

(21) Appl. No.: 12/362,427

(22) Filed: Jan. 29, 2009

(65) Prior Publication Data

US 2010/0189179 A1 Jul. 29, 2010

(51) Int. Cl.
*H04N 7/12* (2006.01)
(52) U.S. Cl. ......... 375/240.16; 375/240.01; 375/240.12; 375/240.17; 375/240.29
(58) Field of Classification Search ............. 375/240.01, 375/240.12, 240.16–240.17, 240.29
See application file for complete search history.

(56) References Cited

U.S. PATENT DOCUMENTS

| | | | |
|---|---|---|---|
| 4,142,071 A | 2/1979 | Croisier et al. |
| 4,216,354 A | 8/1980 | Esteban et al. |
| 4,464,783 A | 8/1984 | Beraud et al. |
| 5,243,420 A | 9/1993 | Hibi |
| 5,381,143 A | 1/1995 | Shimoyoshi et al. |
| 5,418,570 A | 5/1995 | Ueno et al. |
| 5,436,665 A | 7/1995 | Ueno et al. |
| 5,454,011 A | 9/1995 | Shimoyoshi |
| 5,463,424 A | 10/1995 | Dressler |
| 5,537,440 A | 7/1996 | Eyuboglu et al. |
| 5,541,852 A | 7/1996 | Eyuboglu et al. |
| 5,544,266 A | 8/1996 | Koppelmans et al. |
| 5,617,142 A | 4/1997 | Hamilton |
| 5,623,424 A | 4/1997 | Azadegan et al. |
| 5,659,660 A | 8/1997 | Plenge et al. |
| 5,677,735 A | 10/1997 | Ueno et al. |
| 5,835,495 A | 11/1998 | Ferriere |
| 5,970,173 A | 10/1999 | Lee et al. |
| 6,044,089 A | 3/2000 | Ferriere |
| 6,084,909 A | 7/2000 | Chiang et al. |

(Continued)

FOREIGN PATENT DOCUMENTS

EP 0 909 094 4/1999

(Continued)

OTHER PUBLICATIONS

Oskar Flordal, Di Wu, and Dake Liu; Accelerating CABAC Encoding gor Multi-Standard Media with Configurability; Apr. 2006; Iee Xplore; pp. 1-8.*

(Continued)

*Primary Examiner* — Christopher Brown
*Assistant Examiner* — Fahimeh Mohammadi
(74) *Attorney, Agent, or Firm* — Klarquist Sparkman, LLP (57) ABSTRACT

A video encoder uses previously calculated motion information for inter frame coding to achieve faster computation speed for video compression. In a multi bit rate application, motion information produced by motion estimation for inter frame coding of a compressed video bit stream at one bit rate is passed on to a subsequent encoding of the video at a lower bit rate. The video encoder chooses to use the previously calculated motion information for inter frame coding at the lower bit rate if the video resolution is unchanged. A multi core motion information pre-calculation produces motion information prior to encoding by dividing motion estimation of each inter frame to separate CPU cores.

8 Claims, 7 Drawing Sheets

U.S. PATENT DOCUMENTS

| | | |
|---|---|---|
| 6,192,075 B1 | 2/2001 | Jeng |
| 6,192,154 B1 | 2/2001 | Rajagopalan et al. |
| 6,249,288 B1 | 6/2001 | Campbell |
| 6,259,741 B1 | 7/2001 | Chen et al. |
| 6,278,691 B1 | 8/2001 | Ohyama et al. |
| 6,370,502 B1 | 4/2002 | Wu et al. |
| 6,393,059 B1 | 5/2002 | Sugiyama |
| 6,404,814 B1 | 6/2002 | Apostolopoulos et al. |
| 6,426,977 B1 | 7/2002 | Lee et al. |
| 6,434,197 B1 | 8/2002 | Wang et al. |
| 6,463,414 B1 | 10/2002 | Su et al. |
| 6,466,623 B1 | 10/2002 | Youn et al. |
| 6,496,216 B2 | 12/2002 | Feder |
| 6,496,868 B2 | 12/2002 | Krueger et al. |
| 6,504,494 B1 | 1/2003 | Dyas et al. |
| 6,507,615 B1 | 1/2003 | Tsujii et al. |
| 6,522,693 B1 | 2/2003 | Lu et al. |
| 6,526,099 B1 | 2/2003 | Christopoulos et al. |
| 6,647,061 B1 | 11/2003 | Panusopone et al. |
| 6,650,705 B1 | 11/2003 | Vetro et al. |
| 6,678,654 B2 | 1/2004 | Zinser, Jr. et al. |
| 6,728,317 B1 | 4/2004 | Demos |
| 6,757,648 B2 | 6/2004 | Chen et al. |
| 6,925,501 B2 | 8/2005 | Wang et al. |
| 6,931,064 B2 | 8/2005 | Mori et al. |
| 6,934,334 B2 | 8/2005 | Yamaguchi et al. |
| 6,937,653 B2 | 8/2005 | Song et al. |
| 6,944,224 B2 | 9/2005 | Zhao |
| 6,961,377 B2 | 11/2005 | Kingsley |
| 6,963,347 B1 | 11/2005 | Selvaggi et al. |
| 7,027,982 B2 | 4/2006 | Chen et al. |
| 7,039,116 B1 | 5/2006 | Zhang et al. |
| 7,058,127 B2 | 6/2006 | Lu et al. |
| 7,068,718 B2 | 6/2006 | Kim et al. |
| 7,085,322 B2 * | 8/2006 | Ngai et al. ............ 375/240.25 |
| 7,116,714 B2 | 10/2006 | Hannuksela |
| 7,142,601 B2 | 11/2006 | Kong et al. |
| 7,292,634 B2 | 11/2007 | Yamamoto et al. |
| 7,295,612 B2 | 11/2007 | Haskell |
| 7,319,720 B2 | 1/2008 | Abrams, Jr. |
| 7,336,720 B2 | 2/2008 | Martemyanov et al. |
| 7,343,291 B2 | 3/2008 | Thumpudi |
| 7,352,808 B2 | 4/2008 | Ratakonda et al. |
| 7,643,422 B1 | 1/2010 | Covell et al. |
| 7,694,075 B1 | 4/2010 | Feekes, Jr. |
| 7,885,341 B2 * | 2/2011 | Chen et al. ............ 375/240.29 |
| 7,936,820 B2 * | 5/2011 | Watanabe et al. ........ 375/240.16 |
| 8,130,828 B2 | 3/2012 | Hsu et al. |
| 2002/0036707 A1 | 3/2002 | Gu |
| 2002/0080877 A1 | 6/2002 | Lu et al. |
| 2002/0090027 A1 | 7/2002 | Karczewicz et al. |
| 2002/0131492 A1 | 9/2002 | Yokoyama |
| 2002/0136298 A1 | 9/2002 | Anantharamu |
| 2002/0172154 A1 | 11/2002 | Uchida et al. |
| 2003/0185298 A1 | 10/2003 | Alvarez et al. |
| 2003/0206597 A1 | 11/2003 | Kolarov et al. |
| 2003/0227974 A1 | 12/2003 | Nakamura et al. |
| 2004/0117427 A1 | 6/2004 | Allen et al. |
| 2004/0125877 A1 | 7/2004 | Chang |
| 2004/0136457 A1 | 7/2004 | Funnell et al. |
| 2004/0165667 A1 | 8/2004 | Lennon et al. |
| 2004/0264489 A1 | 12/2004 | Klemets et al. |
| 2005/0041740 A1 | 2/2005 | Sekiguchi |
| 2005/0053157 A1 | 3/2005 | Lillevold |
| 2005/0075869 A1 | 4/2005 | Gersho et al. |
| 2005/0084007 A1 | 4/2005 | Lightstone et al. |
| 2005/0165611 A1 | 7/2005 | Mehrotra et al. |
| 2005/0175091 A1 | 8/2005 | Puri et al. |
| 2005/0180511 A1 | 8/2005 | Arafune et al. |
| 2005/0207497 A1 * | 9/2005 | Rovati et al. ............ 375/240.16 |
| 2005/0228854 A1 | 10/2005 | Steinheider et al. |
| 2005/0232497 A1 | 10/2005 | Yogeshwar et al. |
| 2006/0002479 A1 | 1/2006 | Fernandes |
| 2006/0114995 A1 | 6/2006 | Robey et al. |
| 2006/0120610 A1 | 6/2006 | Kong et al. |
| 2006/0126726 A1 | 6/2006 | Lin et al. |
| 2006/0126744 A1 | 6/2006 | Peng et al. |
| 2006/0159169 A1 | 7/2006 | Hui et al. |
| 2006/0215754 A1 | 9/2006 | Buxton et al. |
| 2006/0222078 A1 | 10/2006 | Raveendran |
| 2006/0239343 A1 | 10/2006 | Mohsenian |
| 2006/0245491 A1 | 11/2006 | Jam et al. |
| 2006/0248516 A1 | 11/2006 | Gordon |
| 2007/0053444 A1 | 3/2007 | Shibata et al. |
| 2007/0058718 A1 | 3/2007 | Shen et al. |
| 2007/0058729 A1 | 3/2007 | Yoshinari |
| 2007/0071105 A1 | 3/2007 | Tian et al. |
| 2007/0140352 A1 | 6/2007 | Bhaskaran et al. |
| 2007/0153906 A1 | 7/2007 | Petrescu et al. |
| 2007/0160128 A1 | 7/2007 | Tian et al. |
| 2007/0223564 A1 | 9/2007 | Bruls et al. |
| 2007/0280349 A1 | 12/2007 | Prieto et al. |
| 2008/0046939 A1 | 2/2008 | Lu et al. |
| 2008/0137736 A1 | 6/2008 | Richardson et al. |
| 2008/0144723 A1 | 6/2008 | Chen et al. |
| 2008/0151101 A1 | 6/2008 | Tian et al. |
| 2008/0187046 A1 | 8/2008 | Joch |
| 2008/0259921 A1 | 10/2008 | Nadarajah |
| 2009/0003452 A1 | 1/2009 | Au et al. |
| 2009/0012982 A1 | 1/2009 | Merchia et al. |
| 2009/0110060 A1 | 4/2009 | Cortes et al. |
| 2009/0147859 A1 | 6/2009 | McGowan et al. |
| 2009/0176454 A1 | 7/2009 | Chen et al. |
| 2009/0219993 A1 | 9/2009 | Bronstein et al. |
| 2009/0244633 A1 | 10/2009 | Johnston |
| 2009/0279605 A1 | 11/2009 | Holcomb et al. |
| 2009/0282162 A1 | 11/2009 | Mehrotra et al. |
| 2010/0086048 A1 * | 4/2010 | Ishtiaq et al. ............ 375/240.16 |
| 2010/0091888 A1 * | 4/2010 | Nemiroff ................ 375/240.28 |
| 2010/0272171 A1 | 10/2010 | Xu |
| 2011/0188577 A1 | 8/2011 | Kishore et al. |
| 2012/0056981 A1 | 3/2012 | Tian et al. |

FOREIGN PATENT DOCUMENTS

| | | |
|---|---|---|
| EP | 1 195 992 | 4/2002 |
| JP | 3032088 | 2/2000 |
| JP | 2002-152752 | 5/2002 |
| JP | 9-214965 | 6/2002 |
| JP | 2005-252555 | 9/2005 |
| JP | 2007-036666 | 2/2007 |
| KR | 10-2005-0089720 | 9/2005 |
| KR | 10-2008-0102141 | 11/2008 |
| WO | WO 01/95633 | 12/2001 |
| WO | WO 2004/004359 | 1/2004 |
| WO | WO 2006/096612 | 9/2006 |
| WO | WO 2006/134110 | 12/2006 |
| WO | WO 2010/088030 | 8/2010 |

OTHER PUBLICATIONS

U.S. Appl. No. 60/341,674, filed Dec. 2001, Lee et al.
U.S. Appl. No. 60/488,710, filed Jul. 2003, Srinivasan et al.
U.S. Appl. No. 60/501,081, filed Sep. 2003, Srinivasan et al.
U.S. Appl. No. 60/501,133, filed Sep. 2003, Holcomb et al.
Acharya et al., "Compressed Domain Transcoding of MPEG," *Proc. IEEE Int'l Conf. on Multimedia Computing and Systems*, Austin, Texas, 20 pp. (Jun. 1998).
Amir et al., "An Application Level Video Gateway," *Proc. ACM Multimedia 95*, 10 pp. (Nov. 1995).
Assuncao et al., "A Frequency-Domain Video Transcoder for Dynamic Bit-Rate Reduction of MPEG-2 Bit Streams," *IEEE Transactions on Circuits and Systems for Video Technology*, vol. 8, No. 8, pp. 953-967 (Dec. 1998).
Assuncao et al., "Buffer Analysis and Control in CBR Video Transcoding," *IEEE Transactions on Circuits and Systems for Video Technology*, vol. 10, No. 1, pp. 83-92 (Feb. 2000).
Assuncao et al., "Transcoding of Single-Layer MPEG Video Into Lower Rates," *IEE Proc.—Vis. Image Signal Process.*, vol. 144, No. 6, pp. 377-383 (Dec. 1997).
Braun et al., "Motion-Compensating Real-Time Format Converter for Video on Multimedia Displays," *Proceedings IEEE 4th International Conference on Image Processing (ICIP-97)*, vol. I, pp. 125-128 (1997).
Brightwell et al., "Flexible Switching and Editing of MPEG-2 Video Bitstreams," *IBC-97*, Amsterdam, 11 pp. (1997).

Crooks, "Analysis of MPEG Encoding Techniques on Picture Quality," *Tektronix Application Note*, 11 pp. (Jun. 1998).

Dipert, "Image Compression Article Addendum," *EDN Magazine*, 8 pp. (Jun. 18, 1998).

Fogg, "Question That Should Be Frequently Asked About MPEG," Version 3.8, 46 pp. (1996).

Gibson et al., *Digital Compression for Multimedia*, "Chapter 4: Quantization," Morgan Kaufman Publishers, Inc., pp. 113-138 (1998).

Gibson et al., *Digital Compression for Multimedia*, "Chapter 7: Frequency Domain Coding," Morgan Kaufman Publishers, Inc., pp. 227-262 (1998).

H.264—a New Technology for Video Compression, Nuntius Systems, Mar. 6, 2004, <http://www.nuntius.com/technology3.html>, 4 pages.

Hamming, *Digital Filters*, Second Edition, "Chapter 2: The Frequency Approach," Prentice-Hall, Inc., pp. 19-31 (1977).

Haskell et al., *Digital Video: An Introduction to MPEG-2*, Table of Contents, International Thomson Publishing, 6 pp. (1997).

ISO/IEC, "ISO/IEC 11172-2, Information Technology—Coding of Moving Pictures and Associated Audio for Digital Storage Media at up to about 1.5 Mbit/s—Part 2: Video," 112 pp. (1993).

ISO/IEC, "JTC1/SC29/WG11 N2202, Information Technology—Coding of Audio-Visual Objects: Visual, ISO/IEC 14496-2," 329 pp. (1998).

ISO/IEC MPEG-2 Test Model 5 (with Overview), Mar. 1993, 10 pages.

ITU-T, "ITU-T Recommendation H.261, Video Codec for Audiovisual Services at $p$ x 64 kbits," 25 pp. (1993).

ITU-T, "ITU-T Recommendation H.262, Information Technology—Generic Coding of Moving Pictures and Associated Audio Information: Video," 205 pp. (1995).

ITU-T, "ITU-T Recommendation H.263, Video Coding for Low Bit Rate Communication," 162 pp. (1998).

Joint Video Team (JVT) of ISO/IEC MPEG & ITU-T VCEG, "Joint Final Committee Draft (JFCD) of Joint Video Specification," JVT-D157, 207 pp. (Aug. 2002).

Kari, J.; Gavrilescu, M., "Intensity controlled motion compensation," Data Compression Conference, 1998, DCC '98. Porceedings, vol., No., pp. 249-258, Mar. 30-Apr. 1, 1998.

Keesman et al., "Transcoding of MPEG Bitstreams," *Signal Processing: Image Communication 8*, pp. 481-500 (1996).

Khan et al., "Architecture Overview of Motion Vector Reuse Mechanism in MPEG-2 Transcoding," Technical Report TR2001-01-01, Jan. 2001, 7 pp.

Knee et al., "Seamless Concatenation—A 21st Century Dream," 13 pp. (1997).

Lei et al., "Rate Adaptation Transcoding for Precoded Video Streams," 13 pp. (2000).

Leventer et al., "Towards Optimal Bit-Rate Control in Video Transcoding," *ICIP*, xx pp. (2003).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mook, "Next-Gen Windows Media Player Leaks to the Web," *BetaNews*, 17 pp. (Jul. 2002) [Downloaded from the World Wide Web on Aug. 8, 2003].

Moshnyaga, "An Implementation of Data Reusable MPEG Video Coding Scheme," *Proceedings of World Academy of Science, Engineering and Technology*, vol. 2, pp. 193-196, Jan. 2005.

Moshnyaga, "Reduction of Memory Accesses in Motion Estimation by Block-Data Reuse," *ICASSP '02 Proceedings, IEEE International Conference on Acoustics, Speech, and Signal Processing*, vol. 3, pp. III-3128-III-3131, May 2002.

Nasim et al., "Architectural Optimizations for Software-Bassed MPEG4 Video Encoder," *13th European Signal Processing Conference: EUSIPCO '2005*, 4 pp., Sep. 2005.

Sun et al., "Lossless Coders," *Digital Signal Processing for Multimedia Systems*, Chapter 15, pp. 385-416 (1999).

Printouts of FTP directories from http://ftp3.itu.ch, 8 pp. [Downloaded from the World Wide Web on Sep. 20, 2005].

Reader, "History of MPEG Video Compression—Ver. 4.0," 99 pp. [Document marked Dec. 16, 2003].

Roy et al., "Application Level Hand-off Support for Mobile Media Transcoding Sessions," Proceedings of the 12th International Workshop on Network and Operating Systems Support for Digital Audio and Video, 2002, 22 pages.

Senda et al., "A Realtime Software MPEG Transcoder Using a Novel Motion Vector Reuse and a SIMD Optimization Techniques," *ICASSP '99 Proceedings, 1999 IEEE International Conference on Acoustics, Speech, and Signal Processing*, vol. 4, pp. 2359-2362, Mar. 1999.

Shanableh et al., "Heterogeneous Video Transcoding to Lower Spatio-Temporal Resolutions and Different Encoding Formats," *IEEE Transactions on Multimedia*, 31 pp. (Jun. 2000).

Shanableh et al., "Transcoding of Video Into Different Encoding Formats," *ICASSP—2000 Proceedings*, vol. IV of VI, pp. 1927-1930 (Jun. 2000).

SMPTE, "SMPTE 327M-2000—MPEG-2 Video Recoding Data Set," 9 pp. (Jan. 2000).

Sun et al., "Architectures for MPEG Compressed Bitstream Scaling," *IEEE Transactions on Circuits and Systems for Video Technology*, vol. 6, No. 2, pp. 191-199 (Apr. 1996).

Swann et al., "Transcoding of MPEG-II for Enhanced Resilience to Transmission Errors," *Cambridge University Engineering Department*, Cambridge, UK, pp. 1-4, Sep. 1996.

Tan et al., "On the Methods and Performances of Rational Downsizing Video Transcoding," *Signal Processing: Image Communication 19*, pp. 47-65 (2004).

Tektronix Application Note, "Measuring and Interpreting Picture Quality in MPEG Compressed Video Content," 8 pp. (2001).

Tudor et al., "Real-Time Transcoding of MPEG-2 Video Bit Streams," *BBC R&D*, U.K., 6 pp. (1997).

Vetro et al., "Complexity-Quality Analysis of Transcoding Architectures for Reduced Spatial Resolution," IEEE Transactions on Consumer Electronics, 2002, 9 pages.

Vishwanath et al., "A VLSI Architecture for Real-Time Hierarchical Encoding/Decoding of Video Using the Wavelet Transform," *Proc. ICASSP*, 5 pp. (1994).

Watkinson, *The MPEG Handbook*, pp. 275-281 (2004).

Werner, "Generic Quantiser for Transcoding of Hybrid Video," *Proc. 1997 Picture Coding Symposium*, Berlin, Germany, 6 pp. (Sep. 1997).

Werner, "Requantization for Transcoding of MPEG-2 Intraframes," *IEEE Transactions on Image Processing*, vol. 8, No. 2, pp. 179-191 (Feb. 1999).

Wiegand et al., "Overview of the H.264/AVC Coding Standard," *IEEE Trans. on Circuits and Systems for Video Technology*, vol. 13, No. 7, pp. 560-576 (Jul. 2003).

Youn et al., "Video Transcoder Architectures for Bit Rate Scaling of H.263 Bit Streams," *ACM Multimedia 1999*, Orlando, Florida, pp. 243-250 (1999).

Zhou et al., "Motion Vector Reuse Algorithm to Improve Dual-Stream Video Encoder," *ICSP 2008, 9th International Conference on Signal Processing*, pp. 1283-1286, Oct. 2008.

Kamikura K., Watanabe H., Jozawa H., Kotera H., and Ichinose S. "Global brightness-variation compensation for video coding". _IEEE Trans. on Circuits and Systems for Video Technology- vol. 8, No. 8, (Dec. 1998):988-1000.

Takahashi K., Satou K., Suzuki T., and Yagasaki Y. "Motion Vector Synthesis Algorithm for MPEG2-to-MPEG4 Transcoder" -Proc. of SPIE_ vol. 4310 (Jan. 2001): 872-882.

Zhou et al., "Motion Vector Reuse Algorithm to Improve Dual-Stream Video Encoder," <http://www.ieeexplore.ieee.org/stamp/stamp.jsp?arnumber=4697366&isnumber=469703>, pp. 1283-1286 (downloaded Dec. 30, 2008).

Senda et al., "A Realtime Software MPEG Transcoder using a Novel Motion Vector Reuse and a Simd Optimization Techniques," <http://ieeexplore.ieee.org/stamp/stamp.jsp?arnumber=00758412>, pp. 2359-2362 (downloaded Dec. 30, 2008).

Nasim et al., "Architecture Overview of Motion Vector Reuse Mechanism in MPEG-2 Transcoding," <http://www.medianet.kent.edu/techreports/active-xcoder/TR2001-01-01-AVTv28-arch.pdf, 4 pages, Sep. 2005.

Moshnyaga, "An Implementation of Data Reusable MPEG Video Coding Scheme," <http://www.waset.org/pwaset/v2/v2-49.pdf>, PWASET, vol. 2, pp. 193-196, Jan. 2005.

Moshnyaga, "Reduction of Memory Accesses in Motion Estimation by Block-Data Reuse," <http://ieeexplore.ieee.org/stamp/stamp.jsp?arnumber=1005350&isnumber=21688>, pp. 3128-3131 (downloaded Dec. 30, 2008).

Khan et al., "Architectural Optimizations for Software-Based MPEG4 Video Encoder," <http://www.eurasip.org/Proceedings/Eusipco/Eusipco2005/defevent/papers/cr1097.pdf, Technical Report Jan. 1, 2001, 7 pages, Jan. 31, 2001.

International Search Report and Written Opinion dated Aug. 20, 2010, from International Patent Application No. PCT/US2010/020789, 7 pages.

Akramullah et al., "Parallelization of MPEG-2 Video Encoder for Parallel and Distributed Computing Systems," *IEEE*, pp. 834-837 (Aug. 1995).

Asbun et al., "Very Low Bit Rate Wavelet-Based Scalable Video Compression," *Proc. Int'l Conf. on Image Processing*, vol. 3, pp. 948-952 (Oct. 1998).

ATI Technologies, Inc., "Introduction to H.264," 6 pp. (month unknown, 2005).

Chang et al., "Real-Time Content-Based Adaptive Streaming of Sports Videos," *IEEE*, pp. 139-146 (Jul. 2001).

Chen et al., "Implementation of H.264 Encoder and Decoder on Personal Computers," *Journal of Visual Comm. And Image Representation*, 19 pp. (Apr. 2006).

Chen, "Synchronization and Control of Multi-threads for MPEG-4 Video Decoder," *IEEE 1999 Int'l Conf. on Consumer Electronics*, pp. 298-299 (Jun. 1999).

Dawson, "Coding for Multiple Cores on Xbox 360 and Microsoft Windows," 8 pp. (Aug. 2006) [Downloaded from the Internet on Jan. 22, 2007].

Duffy, "CLR Inside Out: Using Concurrency for Scalability," MSDN Magazine, 11 pp. (Sep. 2006) [Downloaded from the Internet on Jan. 22, 2007].

Foldoc.Org, "priority scheduling," 1 p. (No date) [Downloaded from the Internet on Jan. 26, 2007].

Foldoc.Org, "multitasking," 1 p. (Document dated Apr. 24, 1998) [Downloaded from the Internet on Jan. 26, 2007].

Gerber et al., "Optimizing Video Encoding using Threads and Parallelism: Part 1—Threading a video codec," 3 pp., downloaded from Embedded.com, (Dec. 2009).

Gill, "Tips and Tricks for Encoding Long Format Content with Windows Media Encoder," downloaded from World Wide Web, 12 pp. (document marked Aug. 2003).

Huang et al., "Optimal Control of Multiple Bit Rates for Streaming Media," *Proc. Picture Coding Symposium*, 4 pp. (Dec. 2004).

Intel Corp., "Intel's Next Generation Integrated Graphics Architecture—Intel® Graphics Media Accelerator X3000 and 3000," 14 pp. (Jul. 2006).

Ito et al., "Rate control for video coding using exchange of quantization noise and signal resolution," Electronics & Communications in Japan, Part II, Hoboken, New Jersey, vol. 83, No. 1, Jan. 1, 2000, pp. 33-43.

Jacobs et al., "Thread-Parallel MPEG-2, MPEG-4 and H.264 Video Encoders for SoC Multi-Processor Architectures," *IEEE Trans. On Consumer Electronics*, vol. 52, No. 1, pp. 269-275 (Feb. 2006).

Kim et al., "Multi-thread VLIW processor architecture for HDTV decoding," *IEEE 2000 Custom Integrated Circuits Conf.*, pp. 559-562 (May 2000).

Loomis et al., "VC-1 Technical Overview," 7 pp. (Apr. 2006) [Downloaded from the Internet on Jan. 24, 2007].

Microsoft Corporation, "Windows Media and Web Distribution for Broadcasters," downloaded from the World Wide Web, 4 pp. (document marked Sep. 2007).

Miyata et al., "A novel MPEG-4 rate control method with spatial resolution conversion for low bit-rate coding," Conference Proceedings / IEEE International Symposium on Circuits and Systems (ISCAS), Kobe, Japan, May 23-26, 2005, pp. 4538-4541.

Oehring et al., "MPEG-2 Video Decompression on Simultaneous Multithreaded Multimedia," *Int. Conf. on Parallel Architectures and Compilation Techniques (Pact '99)*, Newport Beach, CA (Oct. 1999).

Ostermann et al., "Video Coding with H.264/AVC: Tools, Performance, and Complexity," *IEEE Circuits and Systems Magazine*, pp. 7-28 (Aug. 2004).

Ozcelebi et al., "Optimal rate and input format control for content and context adaptive video streaming," 2004 International Conference on Image Processing (ICIP), Singapore, Oct. 24-27, 2004, pp. 2043-2046.

Ozcelebi et al., "Optimal rate and input format control for content and context adaptive streaming of sports videos," 2004 IEEE 6th Workshop on Multimedia Signal Processing, Siena, Italy, Sep. 29-Oct. 1, 2004, pp. 502-505.

RealNetworks, Inc., "Chapter 5: Producing Video," downloaded from the World Wide Web, 22 pp. (document marked 2004).

Reed et al., "Optimal multidimensional bit-rate control for video communication," IEEE Transactions on Image Processing, vol. 11, No. 8, pp. 873-874 (Aug. 1, 2002).

Sambe et al., "High-speed Distributed Video Transcoding for Multiple Rates and Formats," *IEICE Trans on Information and Systems*, vol. E88-D, Issue 8, pp. 1923-1931 (Aug. 2005).

SMPTE, "Proposed SMPTE Standard for Television: VC-1 Compressed Video Bitstream Format and Decoding Process," SMPTE 421M, pp. i-xx, 5-7, 23-27 (Aug. 2005).

Tsai et al., "Rate-Distortion Model for Motion Prediction Efficiency in Scalable Wavelet Video Coding," *17th International Packet Video Workshop*, 9 pp. (May 2009).

Van Der Tol et al., "Mapping of MPEG-4 decoding on a flexible architecture platform," *Proceedings of the SPIE, Media Processors*, vol. 4674, 13 pp. (Jan. 2002).

Van Der Tol et al., "Mapping of H.264 decoding on a multiprocessor architecture," *Proceedings of the SPIE*, vol. 5022, pp. 707-718 (May 2003).

Waggoner, "In Depth Microsoft Silverlight," downloaded from the World Wide Web, 94 pp. (document marked 2007).

\* cited by examiner

VIDEO ENCODING USING PREVIOUSLY CALCULATED MOTION INFORMATION

BACKGROUND

With the increasing popularity of playing streaming audio and video over networks such as the internet, there is a need for optimizing the data transferred from a server to a client such that the client's experience is maximized even if network conditions during playback are inconsistent. Optimizing the client's experience involves choosing a quality level for encoding the audio and video portions of the video playback such that the video can be transferred and reconstructed uninterrupted while preserving the quality of the video content.

The quality level is generally dictated by the bit rate specified for the encoded audio or video portions of the input stream. A higher bit rate generally indicates that a larger amount of information about the original audio or video is encoded and retained, and therefore a more accurate reproduction of the original input audio or video will be presented during video playback. Conversely, a lower bit rate indicates that less information about the original input audio or video is encoded and retained, and thus a less accurate reproduction of the original audio or video will be presented during video playback.

Generally, the bit rate is specified for encoding each of the audio and video based on several factors. The first factor is the network condition between the server and the client. A network connection that can transfer a high amount of data indicates that a higher bit rate can be specified for the input video that is subsequently transferred over the network connection. The second factor is the desired start-up latency. Start-up latency is the delay that a video playback tool experiences when first starting up due to the large amount of data that has to be received, processed, and buffered. The third factor is the tolerance to glitching. Glitching is when video playback has to stop because data is missing. In most cases any amount of start-up latency or glitching is intolerable, and it is therefore desirable to optimize the bit rate specified such that the start-up latency and the glitching are minimized or eliminated.

Currently available commercial streaming media systems rely on multi bit rate (MBR) coding to perform coding rate control. In MBR coding, source video content is encoded into alternative bit streams at different coding rates and typically stored in the same media file at the server. This then allows the content to be streamed in segments or chunks at varying levels of quality corresponding to different coding rates according to the changing network conditions, typically using bit stream switching between segments.

Motion Estimation and Compensation in Video Encoding

Numerous techniques have been developed for encoding video to be compressed to a desired bit rate. Such techniques include intraframe compression techniques (in which a frame is compressed as a still image) and interframe compression techniques (in which a frame is predicted or estimated from one or more other frames). Intraframe compression often involves frequency transformations on data followed by lossy and lossless compression. Interframe compression can include motion estimation.

Motion estimation is a process for estimating motion between frames. Motion estimation for video is said to be an ill-posed problem, because the motion within the viewed scene occurs in 3 dimensions, but the successive frames of video are a projection of the 3D scene onto a 2 dimensional image plane. In one common technique, an encoder using motion estimation attempts to match a block of pixels in a current frame with a similar block of pixels (picture elements or samples) in a search area in another frame (called the reference frame). When the encoder finds an exact or "close enough" match in the search area in the reference frame, the encoder parameterizes the change in position of the blocks as motion data (such as a motion vector).

Conversely, motion compensation is a process of reconstructing frames from reference frames using motion data. In one common technique, an encoder or decoder reconstructs a current frame by applying motion data for the current frame to a reference frame, creating a predicted frame. The encoder can compress the difference (sometimes called the residual) between the predicted frame and the original version of the current frame using the same techniques as used for intraframe compression (e.g., lossy and lossless compression). The overall bit rate of the camera video depends very much on the bit rate of the residuals, which can predominate in the overall bit rate compared to the bit rate for motion data. The bit rate of residuals is low if the residuals are simple (i.e., due to motion estimation that leads to exact or good matches according to some criteria), or if lossy compression drastically reduces the complexity of the residuals. On the other hand, the bit rate of complex residuals (i.e., those for which motion estimation fails to find good matches) can be higher, depending on the degree of lossy compression applied to reduce the complexity of the residuals.

SUMMARY

The following Detailed Description concerns techniques (implemented via methods, devices and systems) for video encoding using previously calculated motion information, such as in multi bit rate and multi-core applications. In these various applications, a video encoder takes both raw video content and previously calculated motion information as input. The video encoder can then apply motion compensation based on the previously calculated motion information to encode predicted frames of the raw video content. For various applications, this allows the video encoder to more efficiently apply motion estimation and compensation.

In an example multi bit rate application, the video encoder with previously calculated motion information input is used to encode source video into a plurality of bit streams at successively lower bit rates. For each bit stream encoded at the successive lower bit rate, the video encoder receives the motion information calculated for the previous bit stream at the higher bit rate as its previously calculated motion information input. The video encoder can choose to use this input motion information calculated for the previous bit stream at the higher bit rate to perform motion compensation encoding of the bit stream at a next lower bit rate. However, the video encoder will need to make various adjustments of the encoding parameters to achieve the lower bit rate, such as degree of quantization and video resolution, among other encoding parameters. Because motion estimation for video is an "ill-posed problem" as discussed in the Background above (among other reasons), the motion information previously calculated for the video at the higher encoding bit rate may prove inaccurate for encoding the same source video with the encoding parameters adjusted to achieve the lower bit rate. For example, the motion vector that yields a closer match (with smaller residual) for a given block of a predicted frame can vary between when the reference frame is encoded with the higher bit rate encoding parameters, as compared to when the reference frame is encoded at the lower bit rate. In the example multi bit rate application, the video encoder chooses whether to use the input motion information calculated for the higher bit rate depending on whether the encoding for the next successive bit rate includes a change of video resolution. In the case that the video resolution has not changed for the next successive bit rate, the video encoder uses the input motion information previously calculated for the higher bit rate. But if the video resolution is changed, the video encoder instead calculates the motion information anew for encoding the bit stream at the current bit rate. This newly calculated motion information is passed on as the previously calculated motion information input to the video encoder for the bit stream at the next lower bit rate.

In an example multi core processor application, the motion estimation is performed as a separate pre-calculation phase before input to the video encoder. Intraframe compression is first performed on reference frames of the source video. The motion estimation pre-calculation can then be performed as a largely parallel operation on a multi core computer. Each processor core of the computer is assigned to calculate the motion estimation of a separate frame that is to be encoded using inter-frame (predicted) encoding relative to its respective reference frame. With the computation of motion estimation split in this manner between the processor cores, the video encoder is able to more fully utilize the processing capacity of the multi core computer.

This Summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter. Additional features and advantages of the invention will be made apparent from the following detailed description of embodiments that proceeds with reference to the accompanying drawings.

DETAILED DESCRIPTION

The following detailed description concerns various techniques and systems for video encoding using previously calculated motion information. The techniques described in the context of a multi bit rate streaming application, and a multi core video encoding application. However, the techniques can be applied more broadly to other video encoding applications.

The various techniques and tools described herein may be used independently. Some of the techniques and tools may be used in combination. Various techniques are described below with reference to flowcharts of processing acts. The various processing acts shown in the flowcharts may be consolidated into fewer acts or separated into more acts. For the sake of simplicity, the relation of acts shown in a particular flowchart to acts described elsewhere is often not shown. In many cases, the acts in a flowchart can be reordered.

I. Video Encoder Using Precalculated Motion Information

Figure 1:
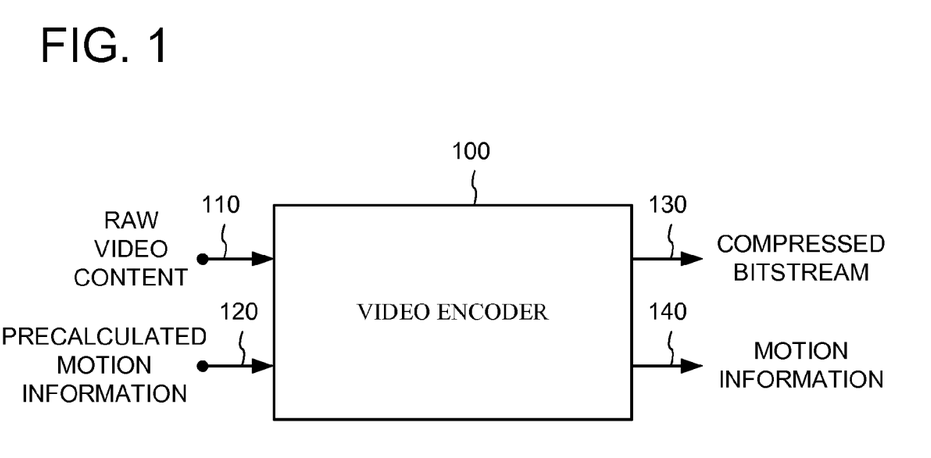
FIG. 1 is a block diagram of a video encoder with precalculated motion information input.

FIG. 1 depicts one example of a video encoder 100 that can be used in the multi bit rate and multi core applications described below. The video encoder 100 has inputs 110, 120 for receiving "raw" (uncompressed) frames of video content and also previously calculated motion information for the video content. The video encoder then performs intra-frame coding of reference frames of the video content, and utilizes the motion information to perform inter-frame coding of the predicted frames of the video content. The encoding can be performed according to a known video encoding standard, such as Windows Media Video format, SMPTE 421-M format, MPEG-x format (e.g., MPEG-1, MPEG-2, or MPEG-4), H.26x format (e.g., H.261, H.262, H.263, or H.264), or other format. However, in the case of inter-frame coding, the video encoder can choose to use the pre-calculated motion information for the inter-frame coding of a predicted frame, rather than performing its own motion estimation for the frame. The video encoder encodes the video content into a compressed bitstream provided as output 130. The video encoder may also output the motion information that it used for inter-frame compression of the input video content as motion information output 140.

Figure 2:
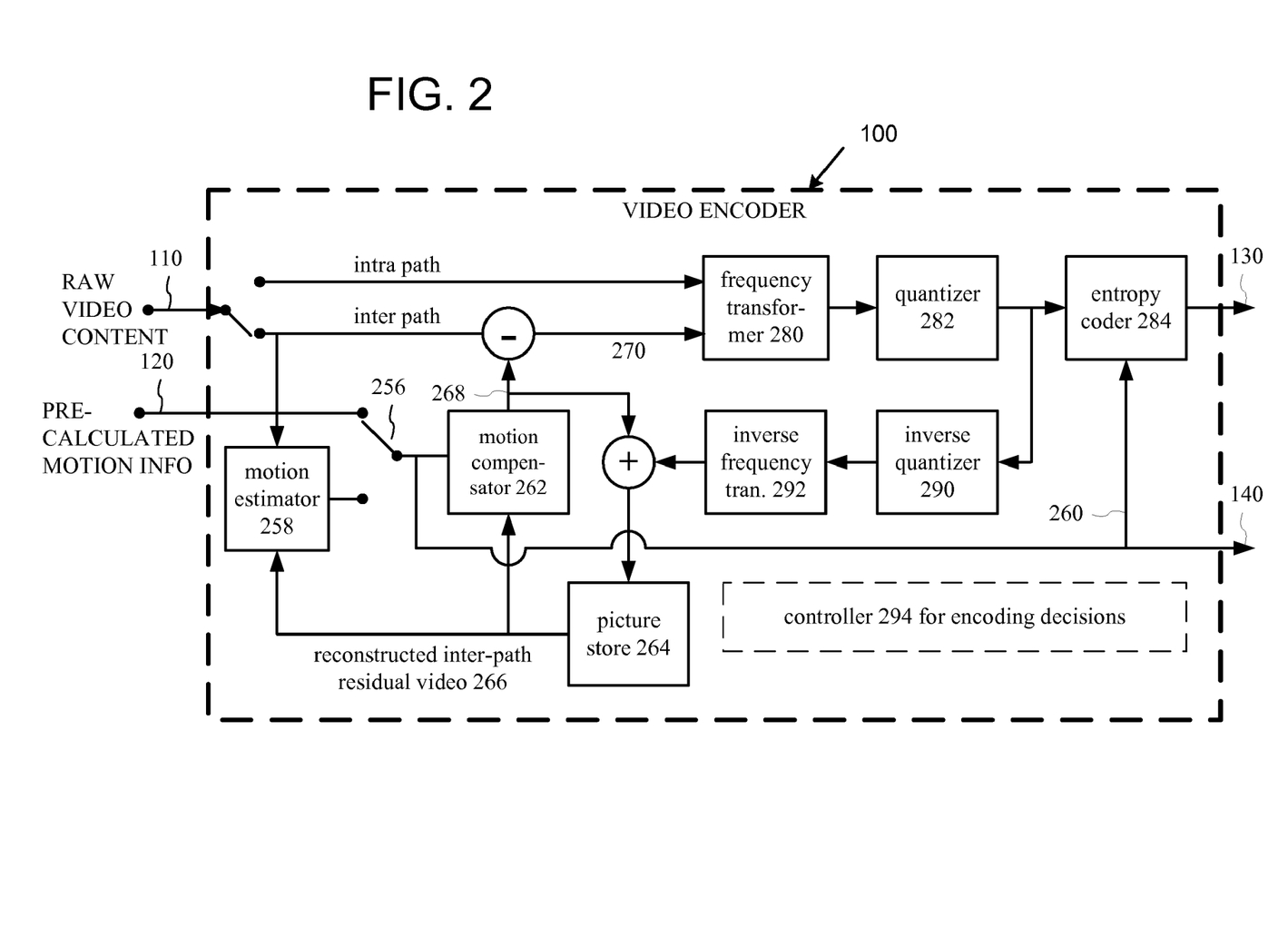
FIG. 2 is a block diagram of a generalized implementation of the video encoder of FIG. 1.

FIG. 2 is a generalized block diagram showing one example suitable implementation of the video encoder 100, in conjunction with which the multi bit rate and multi core techniques described more fully below may be implemented. The video encoder 100 receives a sequence of video pictures (frames) as its raw video content input 110 along with precalculated motion information input 120 and produces a compressed bit stream 130 as output.

The video encoder 100 processes video pictures. The term "picture" generally refers to source, coded, or reconstructed image data. For progressive video, a picture is a progressive video frame. For interlaced video, a picture may refer to an interlaced video frame, the top field of the frame, or the bottom field of the frame, depending on context.

The video encoder 100 compresses inter-coded, predicted pictures of the input video and intra-coded pictures of the input video. For the sake of presentation, FIG. 2 shows a path for intra-coded frames through the encoder 100 and a path for inter-coded predicted frames. Many of the components of the video encoder 100 are used for compressing both intra-coded content and inter-coded, predicted content. The exact operations performed by those components can vary depending on the type of information being compressed.

In general, within the video encoder 100, an inter-coded, predicted frame (as a picture) is represented in terms of prediction from previously reconstructed content (as one or more other pictures, which are typically referred to as reference pictures or anchors). For example, content at a given time is encoded as a progressive P-frame or B-frame, interlaced P-field or B-field, or interlaced P-frame or B-frame. Within the video encoder 100, a prediction residual is the difference between predicted information and corresponding intra-coded frames.

The input video 110 content on the inter-path is encoded as a predicted picture based on motion information. If certain conditions are met, the video encoder 100 uses the pre-calculated motion information from input 120 (as illustrated by selection switch 256), which can be in the form of a set or sequence of motion vector for macroblocks or other sets of samples of the inter-path video picture with respect to one or more reference pictures. In general, the choice to use the pre-calculated motion information can be based on: first, the availability of pre-calculated motion information; and second, which and whether encoding parameters were changed from the previous calculation of the motion information and the parameters used for the current encoding of the video content. In one example, the video encoder will choose not to use the previously calculated motion information from input 130 if the motion information was calculated for encoding the video content with a different video resolution than that which the video encoder is current encoding.

However, the video encoder 100 can instead choose (again illustrated by selection switch 256) to perform new motion estimation for the inter-path video content 110 with motion estimator 258. The motion estimator 258 estimates motion of macroblocks or other sets of samples of the video picture with respect to one or more reference pictures, which represent reconstructions of previously encoded video content frames. The picture store 264 buffers this reconstructed video content 266 as a reference picture or pictures. When multiple reference pictures are used, the multiple reference pictures can be from different temporal directions or the same temporal direction. The motion estimator 258 outputs motion information 260 such as motion vector information.

The motion compensator 262 applies motion vectors (whether from the pre-calculated motion information input or from new motion estimation) to certain reconstructed video content 266 (stored as reference picture(s)) when forming a motion-compensated current picture 268. The difference (if any) between a block of the motion-compensated picture 268 and corresponding block of the original inter-path video picture is the prediction residual 270 for the block. During later reconstruction of the inter-path video frame (e.g., at a video decoder), reconstructed prediction residuals are added to the motion compensated residual video 268 to obtain reconstructed content closer to the original inter-path video 256. In lossy compression, however, some information is still lost from the original inter-path video. Alternatively, a motion estimator and motion compensator apply another type of motion estimation/compensation.

A frequency transformer 280 converts spatial domain video information into frequency domain (i.e., spectral, transform) data. For block-based video content, the frequency transformer 280 applies a DCT, variant of DCT, or other forward block transform to blocks of the samples or prediction residual data, producing blocks of frequency transform coefficients. The frequency transformer 280 may apply an 8×8, 8×4, 4×8, 4×4 or other size frequency transform.

A quantizer 282 then quantizes the blocks of transform coefficients. The quantizer 282 applies non-uniform, scalar quantization to the spectral data with a step size that varies spatially on a picture-by-picture basis, macroblock-by-macroblock basis or other basis. Additionally, in some cases the quantizer varies quantization across color channels of the inter-layer residual video picture. The quantizer 282 can also apply another type of quantization, for example, a uniform or adaptive quantization for at least some spectral data coefficients, or directly quantizes spatial domain data in an encoder system that does not use frequency transformations.

When reconstructed video content is needed for subsequent motion estimation/compensation of an inter-path video picture, an inverse quantizer 290 performs inverse quantization on the quantized spectral data coefficients. An inverse frequency transformer 292 performs an inverse frequency transform, producing blocks of reconstructed prediction residuals (for predicted inter-path residual video content) or samples (for intra-path residual video content). If the residual video content 256 was motion-compensation predicted, the reconstructed prediction residuals are added to the motion-compensated predictors 268 to form the reconstructed residual video. The picture store 264 buffers the reconstructed residual video for use in subsequent motion-compensated prediction.

The entropy coder 284 compresses the output of the quantizer 282 as well as certain side information (e.g., quantization parameter values) Typical entropy coding techniques include arithmetic coding, differential coding, Huffman coding, run length coding, LZ coding, dictionary coding, and combinations of the above. The entropy coder 284 typically uses different coding techniques for different kinds of information, and can choose from among multiple code tables within a particular coding technique.

When the video encoder 240 performs intra-compression of the intra-path video content, the encoder intra-compresses it as an intra-coded picture, without motion compensation. The video 256 is provided directly to the frequency transformer 280, quantizer 282, and entropy coder 284 and output as encoded video. A reconstructed version of the intra-coded video can be buffered for use in subsequent motion compensation of other inter-path video.

A controller 294 receives inputs from various modules such as the motion estimator 258, frequency transformer 280, quantizer 282, inverse quantizer 290, and entropy coder 284. The controller 294 evaluates intermediate results during encoding, for example, setting quantization step sizes and performing rate-distortion analysis. The controller 294 works with other modules to set and change coding parameters during encoding. When the controller 294 evaluates different coding parameter choices, the controller 294 may iteratively perform certain stages to evaluate different parameter settings, or the controller 294 may jointly evaluate different coding parameters. The tree of coding parameter decisions to be evaluated, and the timing of corresponding encoding, depends on implementation. In some embodiments, the controller 294 also receives input from an encoding session wizard interface, other encoder application interface, or other source to designate video to be encoded using specific rules.

In certain applications, the video encoder 100 also may output the motion information that was used for motion compensation of the inter-path video content (whether from pre-calculated motion information input 130 or motion estimator 258), such as for use as pre-calculated motion information for encoding the raw video content using varying other encoding parameters to achieve a different bit rate in the multi bit rate application discussed below.

II. Multi Bit Rate Video Encoder

The video encoder 100 illustrated in FIGS. 1 and 2 can be used to produce an indexed file for multi bit rate video streaming applications. The indexed file generally divides video of a multimedia program into multiple streaming segments, and contains a number of compressed bit streams representing the video segments at various bit rates.

In general, the indexed file for multi bit rate streaming can be used by standard HTTP servers to serve multimedia content at multiple bit rates with bit rate selection (rate control) being performed client-side (e.g., exclusively client-side). Clients can perform rate control by first obtaining index information from the server describing the various bit rates available for streaming segments of a program. Based on the index information, and possibly other information (e.g., network bandwidth, buffer information, etc.), the client can decide which bit rate streaming segments to download from the server to provide a desired user experience (e.g., the best user experience possible based on the available bit rates and current network conditions).

Other types of computing devices (e.g., other than traditional HTTP servers) can provide files using the indexed file. For example, a computing device (e.g., a personal computer, server computer, or special-purpose streaming media server) can use the indexed file layout to serve multimedia content using various file serving protocols (e.g., File Transfer Protocol (FTP), Hypertext Transfer Protocol (HTTP), Real Time Streaming Protocol (RTSP), MMS (Microsoft Media Services), etc.).

In order to support bit rate switching, programs are divided into temporal chunks called streaming segments (self-contained units). The server stores each streaming segment at one or more bit rates (e.g., each streaming segment—bit rate combination is a separate streaming segment encoding). Each streaming segment includes one or more available bit rate encodings for a specific track (e.g., a specific audio track, such as an English audio track, or a specific video track) of a program. Clients then determine which bit rate, from the available bit rates (e.g., from the available streaming segment encodings), to download for each streaming segment. For example, a client may obtain a first streaming segment, for a video track, encoded at 250 Kb/sec (kilo-bits per second) (from one or more available streaming segment encodings for the first streaming segment), a second streaming segment, for the video track, encoded at 500 Kb/sec (from one or more available streaming segment encodings for the second streaming segment), and a third streaming segment, for the video track, encoded at 1 Mb/sec (mega-bit per second) (from one or more available streaming segment encodings for the third streaming segment). Each streaming segment encoding can be at a constant bit rate (CBR) or at a variable bit rate (VBR) (and the use of CBR and VBR can be mixed on a per streaming segment encoding basis).

Figure 3:
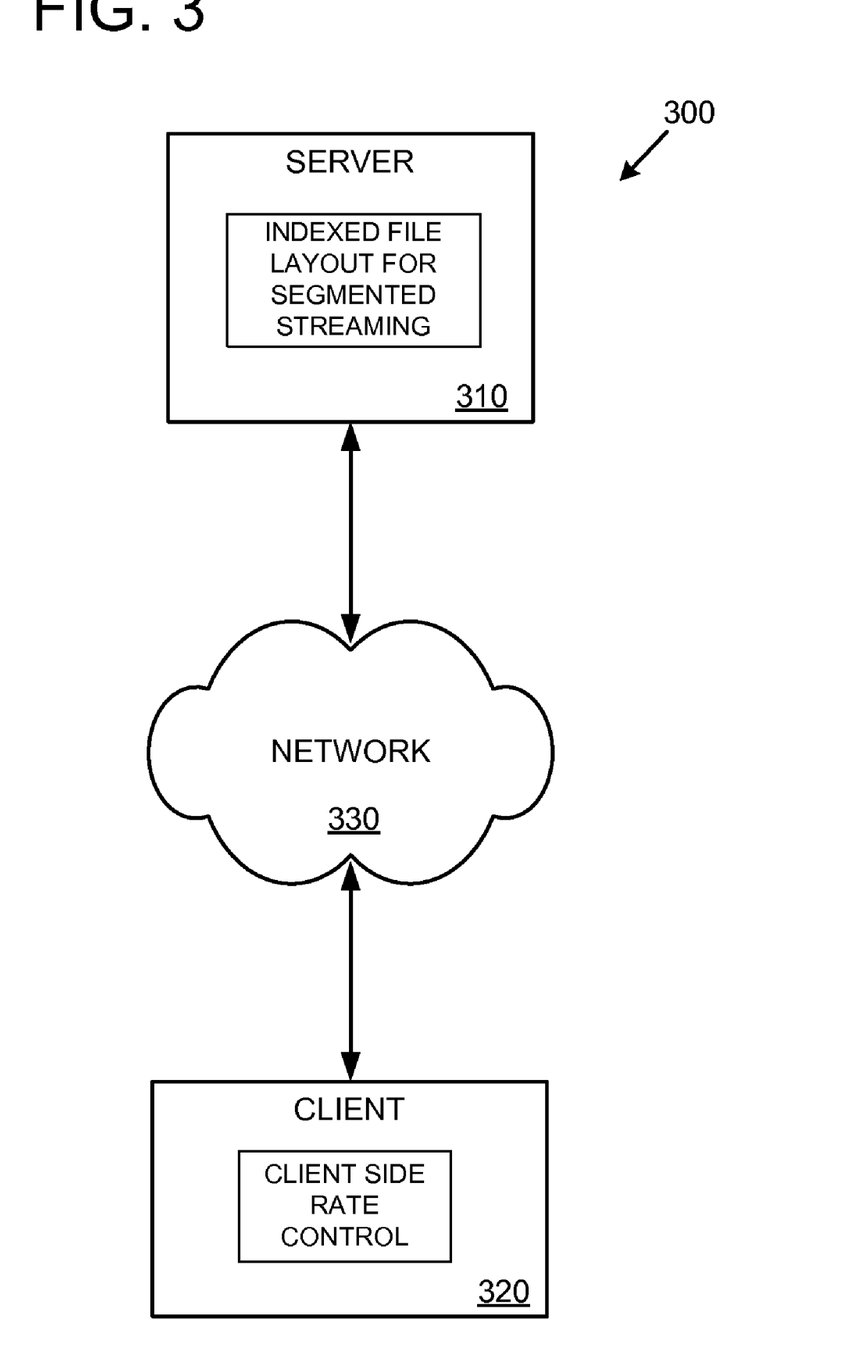
FIG. 3 is a block diagram of a video streaming system that provides segmented streaming of video at variable bit rates.

FIG. 3 depicts a generalized block diagram 300 of a system for segmented streaming of multimedia content using an indexed file layout. In the diagram 300, a server 310 (e.g., a server computer system such as a standard HTTP server) provides multimedia content to a client 320 (e.g., a client computer system, such as a laptop or desktop computer, or another type of computing device, such as a PDA or mobile phone) via a network 330 (e.g., the Internet). In the diagram 300, the server 310 stores programs in an indexed file. The client 320 comprises client-side rate control software and/or hardware.

In one specific example implementation, the server 310 is a standard HTTP server without any specialized streaming capability other than the ability to serve files. Because the server 310 does not support any specialized bit rate selection capability, the client 320 must perform all bit rate selection activities. In this implementation, the client 320 performs all bit rate selection activities. For example, the client 320 can perform rate control using the index information obtained from the server 310 (e.g., alone or in combination with other information, such as client buffer information, network bandwidth, etc.). However, in other implementations, some or all of the rate-control functions can occur at the server.

Figure 4:
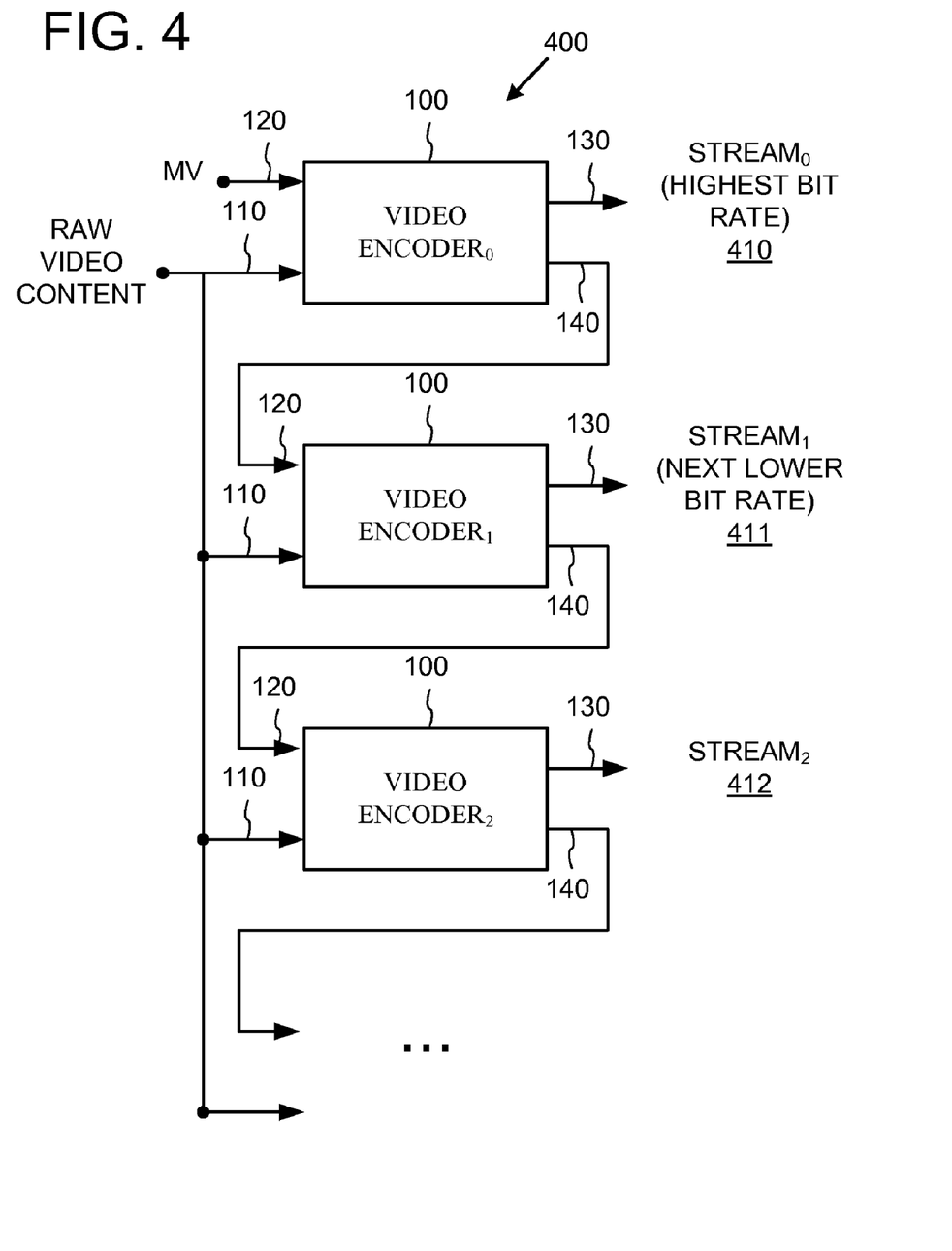
FIG. 4 is a block diagram of a video encoding system for encoding a segmented video streaming file using the video encoder of FIG. 1 for use in segmented streaming by the video streaming system of FIG. 3.

FIG. 4 illustrates a multi bit rate video encoding system 400 that uses the video encoder 100 (FIG. 1) with pre-calculated motion information for encoding video of a multimedia program into a set of bit streams 410-412 at various bit rates for use in the multi bit rate video streaming system 300 (FIG. 3). As illustrated in the diagram, the video encoding system 400 produces the set of bit streams starting from an initial highest bit rate stream 410, and including bit streams 411-412 at a succession of decreasing bit rates. For purposes of illustration, FIG. 4 shows the multi bit rate video encoding system 400 producing three successively decreasing bit rate streams. However, it should be apparent that the multi bit rate video encoding system can be designed to produce any number of streams at various bit rates.

Figure 5:
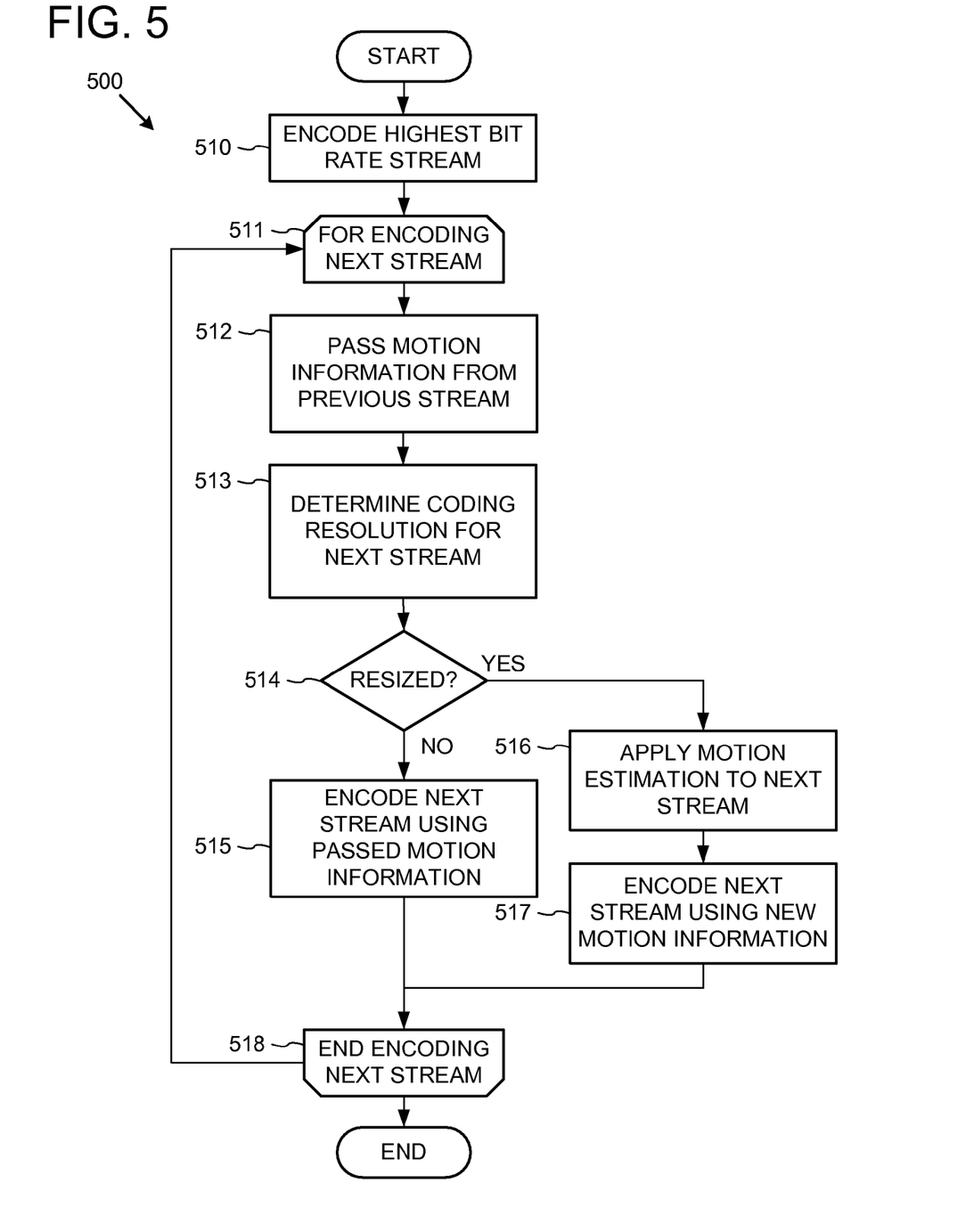
FIG. 5 is a flow chart of the process performed by the video encoding system of FIG. 4.

FIG. 5 illustrates a process flow 500 performed by the multi bit rate video encoding system 400 for encoding the set of bit streams 410-412. At a first action, the multi bit rate video encoding system 400 first encodes an initial highest bit rate stream 410. For the initial highest bit rate stream 410, the video encoding system 400 inputs the raw video content to the video input 110 of the video encoder 100. Because this is the initial encoding of the video content, pre-calculated motion information generally is not available, and the motion information input 120 of the video encoder is zero. In this case, the motion estimator 258 (FIG. 2) of the video encoder 100 performs the motion estimation process to produce motion information for motion compensation of the inter-frames of the video content for the highest bit rate stream. Alternatively, in the case that pre-calculated motion information is available (such as where the motion information is pre-calculated using a multi core motion pre-calculation discussed below), the pre-calculated motion information is provided to the input 120 of the video encoder 100. The video encoder can then choose (e.g., via motion information selection switch 256 in FIG. 2) to use the input motion information for motion compensation of the inter-frames during encoding.

In a repeated loop of actions 511-518, the multi-rate video encoding system next encodes each subsequent bit rate stream 411-412. For these subsequent streams 411-412 at successively decreasing bit rates, the multi bit rate video encoding system 400 again provides the same raw video content at input 110 of the video encoder 100. In addition, the motion information used for motion compensation of each stream 410-412 is provided at the output 140 of the video encoder 100, and passed on to the motion information input 120 of the video encoder of the next stream 411-412 as shown at action 512. Thus, for example, the motion information calculated by the motion estimator 258 in the video encoder for the initial stream 410 is passed on for use by the video encoder of the next lower bit rate stream 411.

As indicated by actions 513-517, the video encoder for each subsequent bit rate stream then chooses (e.g., via motion information selection switch 256) whether to use the motion information passed on from the previous stream to its input 120 (action 515), or to perform a new motion estimation (action 516). In general, the decision whether to use the pre-calculated motion information or perform motion estimation anew is made based on whether the encoding parameters are being changed to achieve the next lower bit rate to an extent that the motion information may not be sufficiently reliable to perform motion compensation with a desired encoding efficiency and quality. In one example implementation of the multi bit rate video encoding system 400, the motion information selection can be based on whether the video resolution is changed to achieve the new lower bit rate for the current stream 411-412. Accordingly, the video encoder determines the video resolution to be used for encoding the stream at action 513. At decision 514, the motion information selection switch 256 decides which motion information to use based on whether the video resolution is resized relative to that of the previous stream. If the video resolution remains unchanged, the video encoder chooses to encode the subsequent stream using the motion information passed on from encoding the previous stream as shown by action 515. However, if the video resolution is changed, the video encoder instead uses its motion estimator 258 to perform a new motion estimation (action 516) for the video content with the reference frames being intra-coded at the new video resolution. At action 517, the video encoder then encodes the stream using this new motion information. The newly calculated motion information would then be passed to the video encoder of the next lower bit rate stream (at action 512 in a next iteration of the loop 511-518 for encoding the next subsequent stream).

In this way, the motion information calculated from motion estimation during encoding of a previous bit rate stream is passed on, and may be used by the multi bit rate video encoding system 400 for encoding of inter frames of a subsequent lower bit rate stream.

III. Multi Core Motion Calculation Video Encoder

Similar to the motion estimator 258 of the video encoder 100 discussed above, motion estimation is typically performed for blocks or like other set of samples in an inter-frame picture with respect to a reference picture that generally is reconstructed (i.e., as would be done by a video decoder) from a previously encoded frame (e.g., typically a previously encoded intra-frame of the video). The motion estimation typically involves a search for a most closely matching block in the reference picture. In other words, the motion estimation attempts to locate a block in the reference picture that produces a smallest residual for a given block of the inter frame picture, and yields motion information (such as a motion vector) that is the spatial displacement between the given inter frame picture block and the closest matching block of the reference frame. The reason for the motion estimation to use reference frames that are reconstructed intra coded frames is that only such previously encoded frames will be identically available in the decoder for use in reconstructing inter-coded frames.

The following section presents a technique that uses a multi core processor computer to perform motion estimation pre-calculation for raw video content that can then be used as pre-calculated motion information input to the video encoder 100. Unlike conventional motion estimation, this motion estimation pre-calculation is performed prior to any encoding (including intra-frame coding) of the video content. Accordingly, there are no previously encoded frames yet available that could be reconstructed for use as the reference frames. This multi core motion information pre-calculation technique uses frames of the raw video content for the reference pictures of the motion estimation, instead of reconstructed intra-coded frame pictures. Due to quantization and other compression loss when later encoded by the video encoder 100, these raw video frames used as reference frames generally cannot be identically reconstructed at the decoder. Because of the use of raw video frames as reference pictures in this multi core motion estimation pre-calculation, the motion information may not be as accurate as motion estimation during video encoding based on reconstructed, previously encoded intra frames, which may result in less compression efficiency when used for inter frame encoding.

Figure 6:
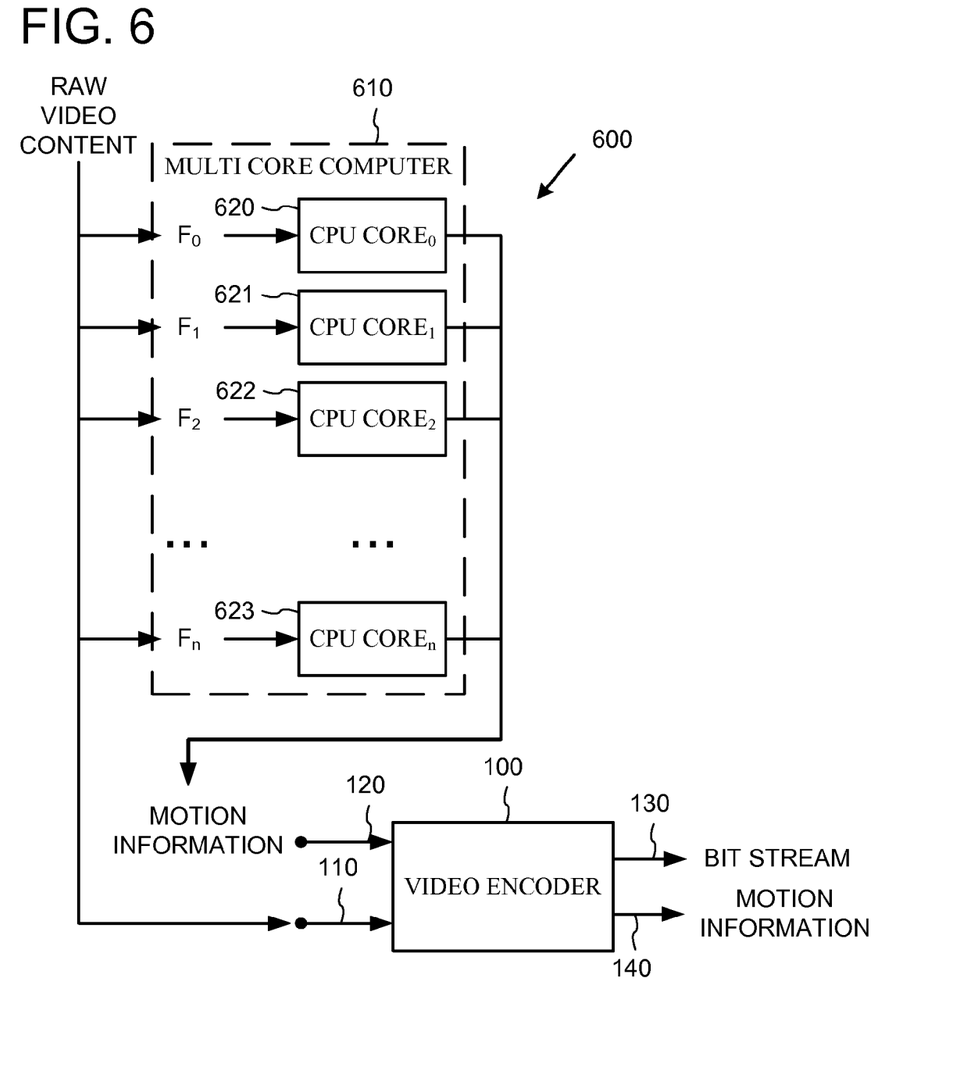
FIG. 6 is a data flow diagram of a video encoding system that uses multi core processors for pre-calculation of motion information for the video encoder of FIG. 1.

FIG. 6 illustrates one example implementation of a video encoding system 600 that includes a motion information pre-calculation on a multi core processor computer, together with encoding using the pre-calculated motion information input video encoder 100 (FIG. 1). The video encoding system 600 performs motion estimation as a pre-calculation (prior to video encoding).

The video encoding system 600 achieves a performance advantage by dividing the computation load of the motion estimation among the separate CPU cores 620-623 of a multi core processor computer 610. The multi core processor computer 610 can have any number "n" of CPU cores on which the motion estimation is processed. For example, presently available multi core computers manufactured by Intel and other have 4, 8, 16, 32, 64 and even many more processor cores.

For the motion estimation, the CPU cores 620-623 are assigned to each perform the motion estimation of a separate inter-frame out of a group of frames of the raw video content. In this way, the motion estimation pre-calculation avoids memory contention between the CPU cores. Separate inter-frames of the raw video content (labeled $F_0 \ldots F_n$ in the drawing) are provided along with the respective reference frame to separate CPU cores of the computer 610. The CPU cores perform motion estimation on their respective inter frame picture and produce motion information (such as a set of motion vectors for the blocks of the inter frame). This is then repeated for a next group of inter frame pictures of the raw video content (e.g., in groups of "n" frames per iteration) to produce motion information for the full video sequence or program.

The motion information produced by the motion estimation pre-calculation using the CPU cores can then be input to the video encoder 100 (FIG. 1) along with the raw video content. The video encoder 100 then proceeds to encode the video, including encoding the inter frames of the video content using the motion information from the multi core motion estimation pre-calculation. Because the video encoder 100 uses motion information from the multi-core motion estimation pre-calculation, the video encoder 100 avoids performing the motion estimation (in motion estimator 258) itself, which saves a substantial part of the video encoding. Because the motion estimation is performed essentially in parallel among the multi CPU cores as a pre-computation rather than sequentially as the video frames are encoded, this multi core video encoder achieves much faster encoding of the video.

IV. Representative Computing Environment

Figure 7:
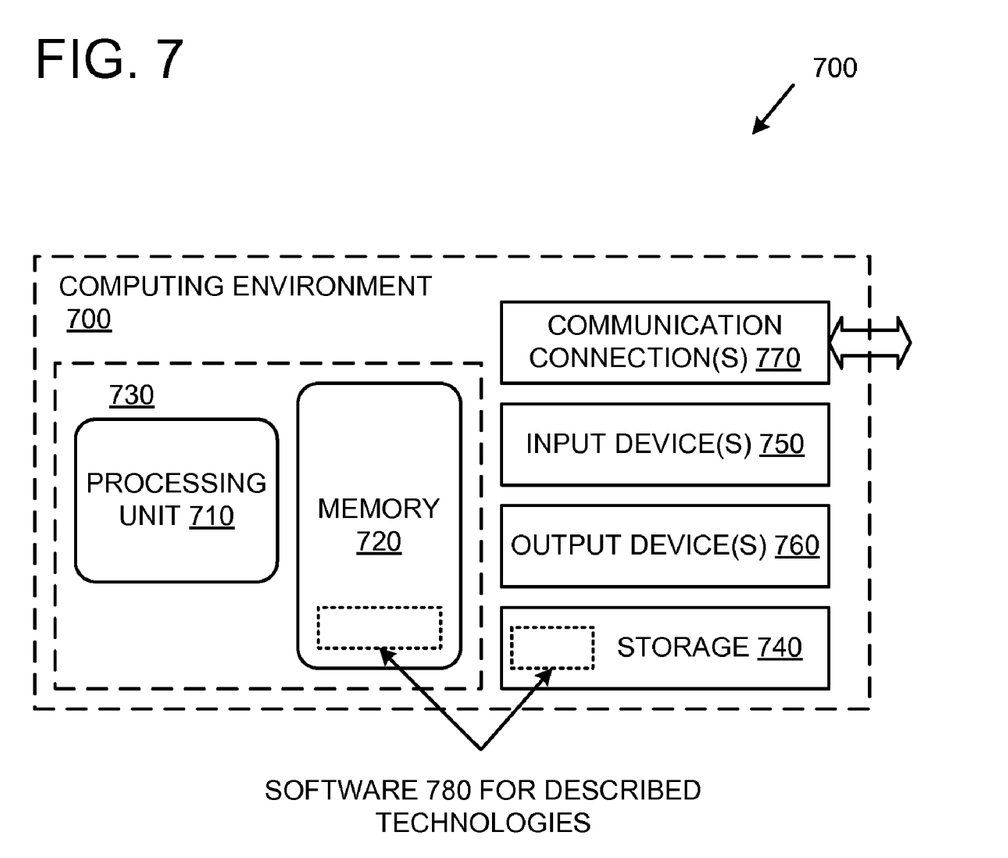
FIG. 7 is a block diagram of a generalized operating environment in conjunction with which various described embodiments may be implemented.

FIG. 7 illustrates a generalized example of a suitable computing environment 700 in which described embodiments, techniques, and technologies may be implemented. The computing environment 700 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, mini-computers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 7, the computing environment 700 includes at least one central processing unit 710 and memory 720. For the multi core motion information precalculation discussed above, the computer includes a multi core CPU having plural CPU cores. In FIG. 7, this most basic configuration 730 is included within a dashed line. The central processing unit 710 executes computer-executable instructions and may be a real or a virtual processor. In a multi-processing system, multiple processing units execute computer-executable instructions to increase processing power and as such, multiple processors can be running simultaneously. The memory 720 may be volatile memory (e.g., registers, cache, RAM), non-volatile memory (e.g., ROM, EEPROM, flash memory, etc.), or some combination of the two. The memory 720 stores software 780 that can, for example, implement the technologies described herein. A computing environment may have additional features. For example, the computing environment 700 includes storage 740, one or more input devices 750, one or more output devices 760, and one or more communication connections 770. An interconnection mechanism (not shown) such as a bus, a controller, or a network, interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, CD-RWs, DVDs, or any other medium which can be used to store information and which can be accessed within the computing environment 700. The storage 740 stores instructions for the software 780, which can implement technologies described herein.

The input device(s) 750 may be a touch input device, such as a keyboard, keypad, mouse, pen, or trackball, a voice input device, a scanning device, or another device, that provides input to the computing environment 700. For audio, the input device(s) 750 may be a sound card or similar device that accepts audio input in analog or digital form, or a CD-ROM reader that provides audio samples to the computing environment 700. The output device(s) 760 may be a display, printer, speaker, CD-writer, or another device that provides output from the computing environment 700.

The communication connection(s) 770 enable communication over a communication medium (e.g., a connecting network) to another computing entity. The communication medium conveys information such as computer-executable instructions, compressed graphics information, or other data in a modulated data signal.

Computer-readable media are any available media that can be accessed within a computing environment 700. By way of example, and not limitation, with the computing environment 700, computer-readable media include memory 720, storage 740, the communication medium, and combinations of any of the above. As should be readily understood, the term computer-readable storage media includes the media for data storage such as memory 720 and storage 740, and not simply transmission media such as modulated data signals.

Any of the methods described herein can be performed via one or more computer-readable media (e.g., storage or other tangible media) comprising (e.g., having or storing) computer-executable instructions for performing (e.g., causing a computing device, audio and/or video processing device, or computer to perform) such methods. Operation can be fully automatic, semi-automatic, or involve manual intervention.

Having described and illustrated the principles of our innovations in the detailed description and accompanying drawings, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method of processing raw video content input for encoding into multi bit rate video, the method comprising:
   receiving raw video content for encoding as compressed video bit streams at a succession of progressively lower bit rates;
   encoding an initial compressed video bit stream at a highest bit rate, said encoding the initial compressed video bit stream producing motion information for encoding of inter frame pictures of the video;
   for encoding subsequent compressed video bit streams at the progressively lower bit rates,
      passing the motion information produced from encoding a preceding compressed video bit stream to the encoding of the subsequent compressed video bit stream;
      determining whether a condition based on the video encoding parameters for the subsequent compressed video bit stream is met;
      if said condition is met, encoding the subsequent compressed video bit stream wherein inter frames of the subsequent compressed video bit stream are encoded using the motion information passed from encoding the preceding compressed video bit stream; and
      if said condition is not met, producing new motion information by performing motion estimation based on reconstructed reference frames of the subsequent compressed video bit stream, and encoding the subsequent compressed video bit stream wherein inter frames of the subsequent compressed video bit stream are encoded using the new motion information; and
   producing an output multi bit rate video comprising the initial and subsequent compressed video bit streams.

2. The method of claim 1 wherein said condition is that the video resolution remain unchanged between the preceding compressed video bit stream and the subsequent compressed video bit stream.

3. A method of encoding video on a computer having a multi core CPU, the method comprising:
   producing motion information for groups of inter frame pictures of a video as a motion estimation pre-calculation prior to encoding of the video, wherein said producing motion information comprises:
      for each inter frame picture in a group, performing motion estimation on a separate one of plural CPU cores of the computer, said motion estimation producing motion information for plural sets of elements of the respective inter frame picture;
   encoding the video, wherein said encoding comprises encoding the inter frame pictures based on the motion information produced by the motion estimation pre-calculation; and
   producing an output compressed video bit stream containing the encoded video.

4. The method of claim 3 further comprising:
   encoding the video as one or more additional streams at progressively lower bit rates, wherein said encoding the additional streams comprises:
      passing the motion information produced from encoding a preceding compressed video bit stream to the encoding of a subsequent compressed video bit stream;

determining whether a condition based on the video encoding parameters for the subsequent compressed video bit stream is met;

if said condition is met, encoding the subsequent compressed video bit stream wherein inter frames of the subsequent compressed video bit stream are encoded using the motion information passed from encoding the preceding compressed video bit stream; and if said condition is not met, producing new motion information by performing motion estimation based on reconstructed reference frames of the subsequent compressed video bit stream, and encoding the subsequent compressed video bit stream wherein inter frames of the subsequent compressed video bit stream are encoded using the new motion information; and producing an output multi bit rate video comprising the initial and subsequent compressed video bit streams.

5. The method of claim 4 wherein said condition is that the video resolution remain unchanged between the preceding compressed video bit stream and the subsequent compressed video bit stream.

6. A video processing system for encoding compressed video streams for multiple bit rate video streaming, the system comprising:

a memory for storing raw video content to be encoded;

a computer processing means programmed for encoding the raw video content as a plurality of compressed video streams, wherein said encoding the compressed video streams comprises:

producing original motion information for encoding inter-frame pictures of the raw video content via motion estimation;

encoding a top quality compressed video bit stream from the raw video content using the original motion information for encoding inter-frame pictures of the raw video content;

deciding a video resolution for encoding a subsequent compressed video bit stream at a lower bit rate;

if the video resolution for encoding the subsequent compressed video bit stream is unchanged, encoding the subsequent compressed video bit stream from the raw video content again using the original motion information for encoding inter-frame pictures of the raw video content; and otherwise if the video resolution for encoding the subsequent compressed video bit stream is resized from that of the top quality compressed video bit stream, then producing new motion information for encoding inter-frame pictures of the raw video content via motion estimation relative to intra-frame reference pictures of the subsequent compressed video bit stream, and encoding the subsequent compressed video bit streams from the raw video content using the new motion information for encoding inter-frame pictures of the raw video content.

7. The video processing system of claim 6 wherein the computer processing means is a multi core computer processor having multiple processing cores, and wherein said producing original motion information comprises, as a pre-calculation prior to encoding intra-frame pictures of the raw video content, performing motion estimation for each inter frame picture in a group of inter frame pictures of the raw video content on a separate one of the processing cores.

8. The video processing system of claim 7 said performing motion estimation for a group of inter frame pictures of the raw video content comprises:

assigning each inter frame picture of the group to a separate processing core of the multi core computer processor; and performing motion estimation for each respective inter frame picture on its assigned separate processing core.

* * * * *